: 
United States Patent [19]

Kohara

[11] Patent Number: 5,903,875
[45] Date of Patent: May 11, 1999

[54] METHOD OF ISSUING A SERVICE TICKET IN TRANSACTIONS OF COMMODITIES BY MAKING USE OF COMMUNICATION

[75] Inventor: Hiroaki Kohara, Ishikawa, Japan

[73] Assignee: A.P.M. Co., Ltd., Japan

[21] Appl. No.: 08/761,464

[22] Filed: Dec. 6, 1996

[30] Foreign Application Priority Data

Dec. 6, 1995 [JP] Japan .................................... 7-345291
Mar. 4, 1996 [JP] Japan .................................... 8-075183

[51] Int. Cl.⁶ ................................................ G06F 151/00
[52] U.S. Cl. .................................. 705/14; 705/26; 705/27
[58] Field of Search .................................. 705/14, 5, 10, 705/26, 27

[56] References Cited

U.S. PATENT DOCUMENTS

| Re. 34,915 | 4/1995 | Nichtberger | 705/14 |
|---|---|---|---|
| 4,674,041 | 6/1987 | Lemon et al. | 705/14 |
| 4,949,256 | 8/1990 | Humble | 705/14 |
| 4,982,346 | 1/1991 | Girouard et al. | 705/14 |
| 4,997,188 | 3/1991 | Nilssen | 705/14 |
| 5,185,695 | 2/1993 | Pruchnicki | 705/14 |
| 5,245,533 | 9/1993 | Marshall | 705/14 |
| 5,256,863 | 10/1993 | Gerguson et al. | 705/14 |
| 5,297,026 | 3/1994 | Hoffman | 705/14 |
| 5,297,193 | 3/1994 | Bouix et al. | 705/14 |
| 5,612,868 | 3/1997 | Off et al. | 705/14 |
| 5,761,648 | 6/1998 | Golden et al. | 705/14 |

OTHER PUBLICATIONS

Robin Kamen, "New way to watch consumers", News Tribune Woodbridge, NJ, Nov. 12, 1989.
Royal Hall strikes up the right note with Unisys & Select Ticketing Systems; M2 Presswire; Dialogue: File 636, Acct# 03392114, Oct. 1996.

*Primary Examiner*—Allen R. MacDonald
*Assistant Examiner*—Romain Jeanty
*Attorney, Agent, or Firm*—King and Schickli

[57] ABSTRACT

A method is provided relating to the issuing of a service ticket in commodity transactions by using a communication system for shopping. More specifically, a purchaser selects the commodity from a plurality of commodities displayed together with letter and image data on the commodities in a display device of the purchaser's terminal. The data is supplied and transmitted by a member store through the communication system. The communication equipments owned by the member stores and a service ticket distributor and the terminal equipment owned by the purchaser are all interconnected via the communication system. The service ticket distributor is provided with a processor, memorizer and manager for handling data relating to purchasers, member stores and the distribution and acquisition of service tickets. The delivery of the service ticket from the member store to the purchaser and the use or redemption of any service ticket by the purchaser at the member store are also performed over the communication system and the associated terminal equipment. Data related to any changes in amount of a service ticket made available through the displays of the terminal equipment so as to be confirmed by the purchasers and/or the member stores.

4 Claims, 4 Drawing Sheets

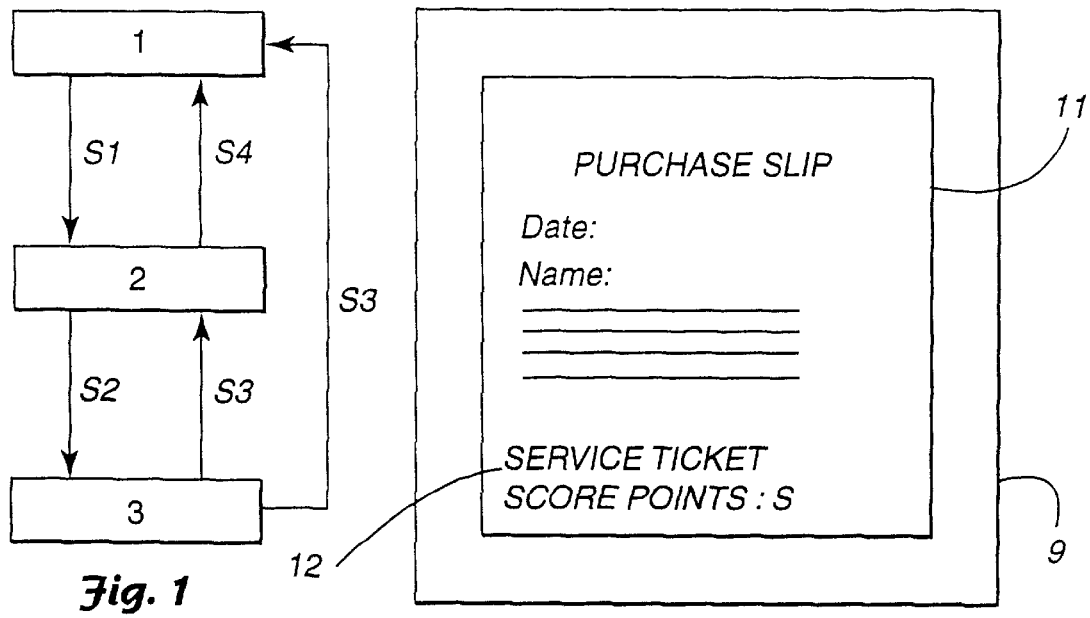
Fig. 1
Fig. 3
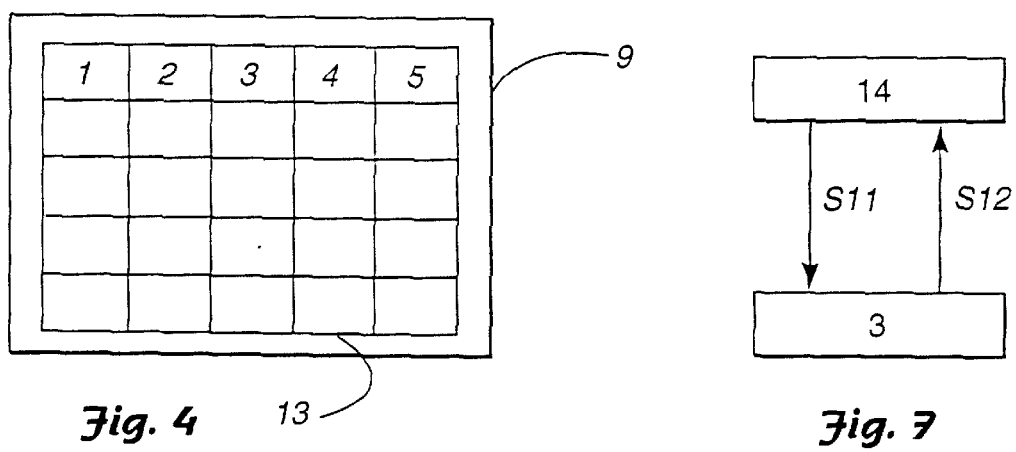
Fig. 4
Fig. 7
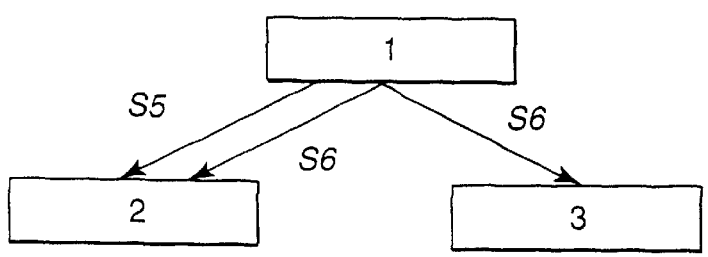
Fig. 5

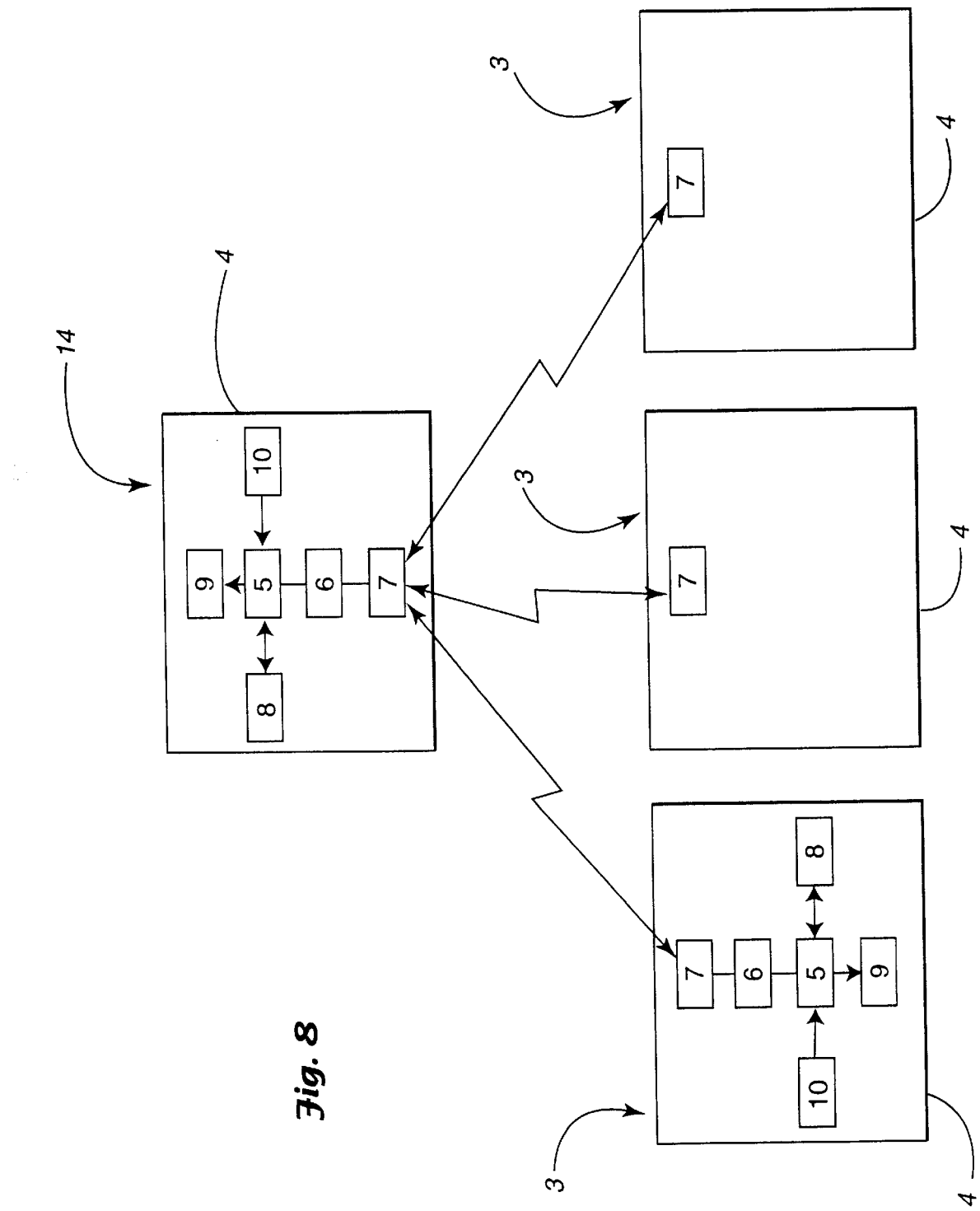

METHOD OF ISSUING A SERVICE TICKET IN TRANSACTIONS OF COMMODITIES BY MAKING USE OF COMMUNICATION

TECHNICAL FIELD

This invention generally relates to a method of issuing a service ticket. Such a service ticket is frequently utilized as a means for promoting the sale of commodities (including not only tangible commodities but also intangible commodities to be offered by the service industry). More particularly, this invention relates to a method of issuing a service ticket in commodities transactions by making use of a communication system, which can be utilized by a group of independent member stores, by a single store or by affiliated stores which are organized in the form a head office and a plurality of branch stores.

BACKGROUND OF THE INVENTION

The service ticket has been utilized in the past as a means to promote the sale of commodities. Namely, the service ticket is usually issued in the form of a stamp ticket or a score point ticket that is handed to a purchaser of a commodity. The quantity of the ticket is typically varied according to the amount of the transaction(s) in question. The service ticket may also be issued in the form of a magnetic card upon which score points may be recorded according to the amount of the transaction(s) in question. These tickets and magnetic card may be exchanged with a premium according to the number or score point thereof collected by the purchaser or buyer. Sometimes, the tickets may be used as a money ticket.

Typically, the service ticket is issued by a service ticket distributor to a member store who pays money for the ticket. The service ticket is a printed matter upon which any value of score points may be recorded. The member store or shop (hereinafter simply referred to as member store) gives a purchaser a predetermined number of score points on the service ticket according to the amount of the transaction(s) between the purchaser and a member store. The purchaser who received the service ticket may keep it by sticking it on a sheet having a service ticket adhering section so as to preserve and to make it easy to calculate the total score points collected by the purchaser.

When the score points on a service ticket accumulate to a predetermined amount, the purchaser is allowed to exchange the service ticket for a specific commodity or to allocate the service ticket to the payment for a commodity at the member store. The service ticket thus used by the purchaser in this manner at the member store is returned again from the member store to the service ticket distributor in exchange for the money corresponding to the amount of the service ticket thus used. In this case, a difference in money between the price per score point of the service ticket which has been paid by the member store to the service ticket distributor when the service ticket is distributed from the service ticket distributor to the member store, and the exchange value of the service ticket at the time of using the service ticket by the purchaser is the handling charge that can be profited by the service ticket distributor.

It should also be appreciated that in the conventional system of distributing the service ticket as a means of promoting the sale of commodities, a purchaser who actually buys a commodity at a member store receives the service ticket as a tangible material. The amount of the service ticket is proportional to the amount of money paid by the purchaser for the commodity, and the service ticket thus received by the purchaser is kept and managed by the purchaser.

In the case of making payment for a commodity through a credit card, a service ticket may be attached to a payment note in accordance with the amount of payment, and the service ticket is kept and managed by the person who utilized the credit card. In this case, the time and method of receiving a service ticket may be somewhat different from the ordinary transaction involving cash. It should be recognized, however, that a tangible service ticket is involved in both cash and credit card transactions.

While effective for its intended purpose, the distribution of tangible service tickets is not without certain attendant disadvantages. First and foremost of these is the need for the purchaser to collect and carefully preserve and manage the service tickets for long periods of time. Otherwise, the service tickets that have been collected by the purchaser may be left unused or lost. In such a situation the purchaser receives no benefit. This is a problem that should be avoided.

Toward the end, the advertisement and transaction of commodities via communication over a personal computer have been recently realized. In this approach, the commodities transaction and payment therefor are all carried out solely through a communication system installed in the purchaser's house.

In such a system, the delivery of a service ticket (which is a tangible material) to the purchaser at the moment of transaction is impossible. Although it may be possible to subsequently deliver the service ticket by mail to the purchaser, such a method of delivering the service ticket is undesirable as it is remote in time, requires significant paper work and handling and is relatively costly.

SUMMARY OF THE INVENTION

Accordingly, an object of the present invention is to provide a method of issuing a service ticket, which is quite suited to commodities transactions made over a communication system, and wherein the preservation and management of the service ticket can be effectively and reliably carried out.

Namely, according to the present invention, there is provided a method of issuing a service ticket in commodity transactions by making use of a communication system as used by a purchaser when shopping for the commodity. Specifically, the purchaser selects the commodity from a plurality of commodities displayed together with letter and image data on the commodities in a display device of a communication system terminal possessed by the purchaser; the letter and image data being supplied and transmitted by a member store through the communication system.

More specifically, the communication equipments owned by the member stores and a service ticket distributor and the terminal equipment owned by the purchaser are connected via a communication system to each other. The service ticket distributor is provided with a processing, memorizing and managing means for dealing with data on a list of purchasers, a list of member stores and the counting of distribution and acquisition of service tickets so as to enable the ticket distributor to operate effectively. The delivery of the service ticket from the member store to the purchaser according to an amount of transaction, information of the transaction between the purchaser and the member store, and execution of the service ticket by the purchaser at the member store are performed by making use of the communication system and via communication system terminals owned individually by the purchasers, the member stores and the service ticket distributor. The data possessed by the service ticket distributor on any changes in amount of a service ticket in the possession of the purchasers and the member stores are made available through the displays of the communication system terminal owned by the purchasers and the member stores. This allows the purchasers and member stores to confirm the changes.

In this case, the delivery of a service ticket to a purchaser may be performed by the service ticket distributor by making use of the communication system. This is possible as the amount of transaction between the member store and the purchaser has been informed to the service ticket distributor by the member store.

Further, according to the present invention, there is also provided a method of issuing a service ticket in commodity transactions by making use of a communication system as used by a purchaser when shopping for the commodity. Specifically, the purchaser selects a commodity from a plurality of commodities displayed together with letter and image data on the commodities in a display device of a communication system terminal possessed by the purchaser; the letter and image data being supplied and transmitted by a member store through the communication system.

This method is characterized in that the communication equipment owned by the member store and the communication system terminal owned by the purchaser are connected via a communication system to each other. As a result the member store is provided with a data on a list of purchasers and with processing, memorizing and managing means for dealing with the counting of distribution and acquisition of service tickets. Further, the delivery of the service tickets from the member store to the purchaser according to an amount of a given transaction, information of said transactions between the purchaser and the member store, and execution of the service ticket by the purchaser at the member store are all performed by making use of the communication system and via the communication system terminals owned individually by the purchasers and the member store. Additionally, the data possessed by the member store on any changes in amount of a service ticket in the possession of purchasers and in the possession of the member store are made available through the displays of the communication system terminal owned by the purchasers and the member store. This allows the purchasers and the member store to confirm any changes.

In this case, the store may be a member store of an organization comprising a plurality of member stores.

Since the transfer of the service ticket is effected through a communication system and hence the possession of a tangible service ticket is not involved, the transfer of the service ticket can be accelerated. Such instantaneous reward is a valuable marketing and promotional tool. Further, since the counting of service tickets collected by a purchaser is processed, memorized and managed by the service ticket distributor and the member store, purchaser need not collect and preserve the service tickets in order to receive the appropriate benefit. This is a significant convenience advantage. It is also possible for member stores or shops and purchasers to visibly confirm the score of any service ticket collected by a purchaser on a display apparatus at any time by making use of the communication system.

BRIEF DESCRIPTION OF THE DRAWING

FIG. 1 is a block diagram showing a flow of service ticket;

FIG. 3 is a diagram showing one example of pattern of a purchase slip for confirming a commodity transaction;

FIG. 4 is a diagram showing one example of pattern illustrating a total amount of service ticket collected;

FIG. 5 is a block diagram illustrating a manner of confirming data on the counting of service ticket collected;

FIG. 7 is a block diagram showing a flow of service ticket according to a further example of this invention;

FIG. 8 is a block diagram illustrating a relationship among communication equipments according to another embodiment of this invention;

DESCRIPTION OF THE PREFERRED EMBODIMENT

Figure 2:
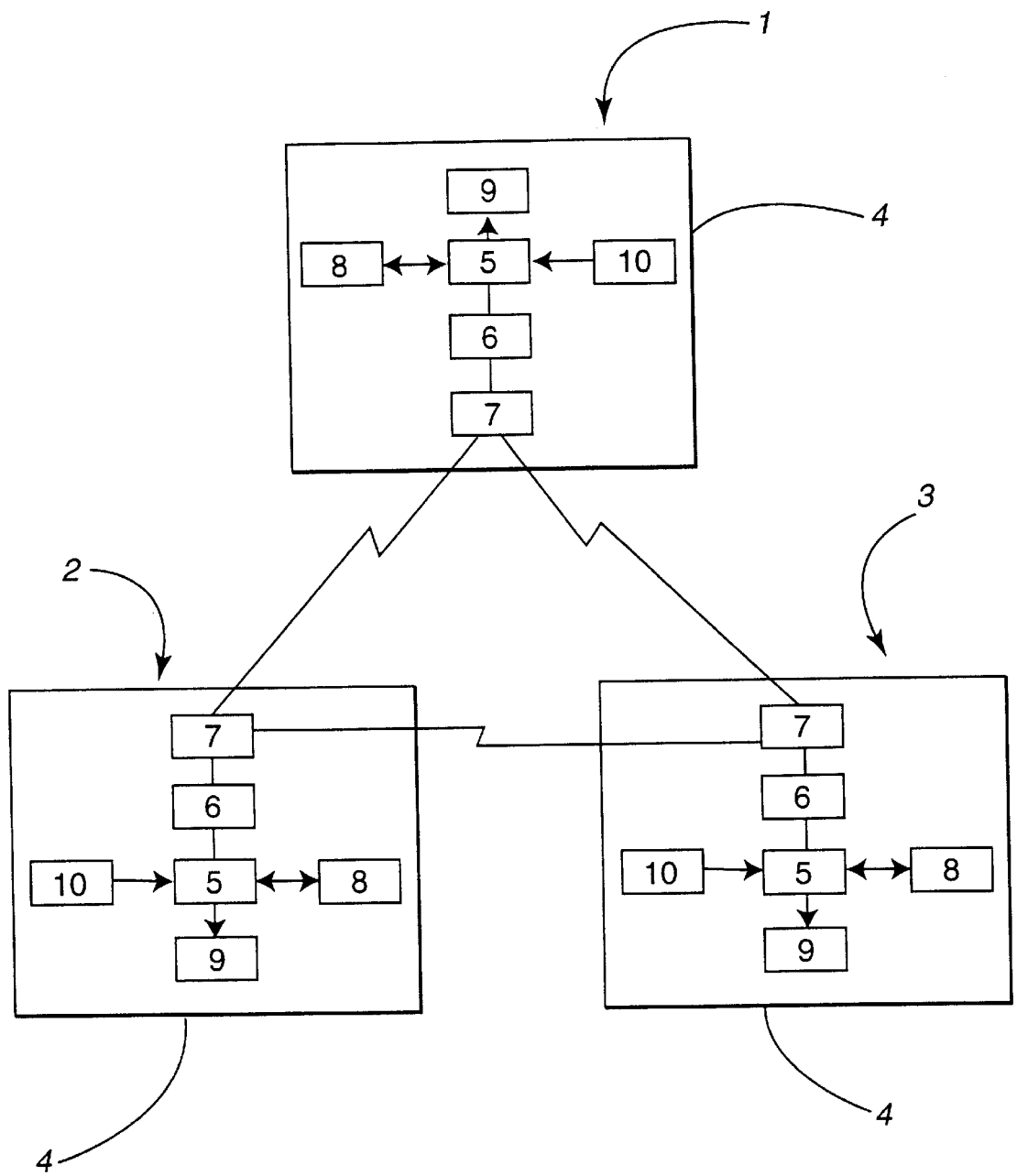
FIG. 2 is a block diagram illustrating a relationship among communication equipments according to one embodiment of this invention.

One embodiment of this invention will be explained further with reference to the drawing figures.

FIG. 1 is a block diagram showing a flow of service ticket according to this invention. Ref erring to FIG. 1, the system of transferring a service ticket is constituted by a service ticket distributor 1, a plurality of member stores (or shops) 2 and a plurality of purchasers 3. These member stores and purchasers are individually connected through a communication system with the service ticket distributor 1.

The service ticket is first transferred from the service ticket distributor 1 to the member stores 2 as shown by a line S1, and then transferred from a member store 2 to a purchaser 3 who bought a commodity from the member store 2 as shown by a line S2. When a predetermined number (or point) of service ticket is accumulated in the purchaser 3 and the service ticket thus accumulated is used for buying a commodity or for exchanging it with a premium as shown by a line S3, the service ticket is returned back to the member store 2 or the service ticket distributor 1. When the service ticket is returned to the member store 2, the service ticket is returned from the member store 2 to the service ticket distributor 1 as shown by a line S4.

In this invention, the service ticket is not transferred as a tangible material, but is transferred as a data via a communication system and the processed data is displayed in a display device.

All of the service ticket distributor 1, the member stores (or shops) 2 and the purchasers 3 are provided with a communication equipment 4 which is capable of transmitting and receiving data as shown in FIG. 2, and connected with each other through a public communication network or a specific communication network. In this FIG. 2, reference numeral 5 denotes a processor, 6 denotes a communication controller, 7 denotes a modulator-demodulator, 8 denotes a memory device, 9 denotes a display device, and 10 denotes an input device (a key board or a mouse).

The purchase of a commodity is conducted by making use of a communication system. More specifically, a data concerning the commodities which are dealt with by a member store is displayed on the screen of display device 9 and then the purchaser selects a specific commodity from a plurality of commodities of the same kind by operating the input device 10 so as to input an instruction of selection after purchase via the letters or images displayed on the screen.

When the purchase of a commodity is instructed as indicated above, a predetermined quantity or value of service ticket according to the amount of money involved in the commodity purchase is delivered to the purchaser. In this case, the score point 12 of the service ticket to be given to the purchaser is indicated to the purchaser also by making use of a communication system. For example, this information can be indicated at a portion of a confirmation display 11 indicating an establishment of transaction as shown in FIG. 3. The information of the score point 12 of the service ticket to the purchaser may be also performed by using a separate display pattern if desired.

Alternatively, the display pattern informing the score point 12 of the service ticket to the purchaser may include a total score point of service ticket up to date (including or not including the score point 12 of the purchase of this time) in addition to the notification of the score point 12 of service ticket obtained this time. Further, the display pattern may be a table 13 (FIG. 4) or a digital display.

The exchange of the service ticket with a specific commodity or the allocation of the service ticket to the payment for a commodity can also be performed operating the input device by making use of the aforementioned communication system while watching the display device 9.

The management of service tickets is performed by the service ticket distributor 1. Namely, the delivery (S5) of service ticket to each member store 2, and the score point 12 of service ticket given to each purchaser 3 from each member store 2 are processed by the processor 5 and the results are memorized in the memory device 8.

These processed data are available to each member store and each purchaser via a communication system (S6) so that these processed data can be confirmed through the individual display device 9 (FIG. 5).

Figure 6:
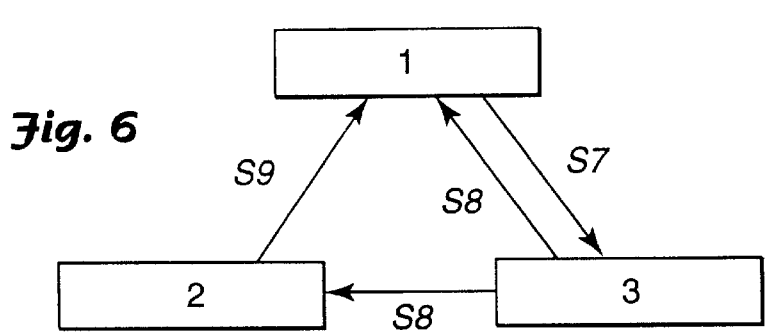
FIG. 6 is a block diagram showing a flow of service ticket according to another example of this invention.

FIG. 6 is a block diagram illustrating the transfer of service ticket.

In this case, the service ticket is directly delivered from the service ticket distributor 1 to the purchaser 3 in accordance with the amount of transaction which has been paid to a member store 2 (S7). When a predetermined number (or point) of service ticket is accumulated the purchaser 3 may buy a commodity or exchange it with a premium as shown by a line S8. When this is done, the service ticket is returned back to the member store 2 or the service ticket distributor 1. When the service ticket is returned to the member store 2, the service ticket is returned from the member store 2 to the service ticket distributor 1 as shown by a line S9.

Next, another example of this invention will be explained with further reference to the drawing figures.

FIG. 7 shows a block diagram illustrating a flow (transfer) of service ticket in a system of issuing a service ticket according to this invention wherein a store 14 and a plurality of purchasers 3 trading with the store 14 are involved.

In this case, the service ticket is delivered to the purchasers 3 as shown by lines S11, and when a predetermined number (or point) of service ticket is accumulated, the purchaser 3 buys a commodity or exchanges it with a premium as shown by a line S12 and the service ticket is returned back to the store 14.

As explained above, the service ticket is transferred not as a tangible ticket but as a data to be dealt with in a communication system and merely displayed in a display device.

All of the store 14 and the purchasers 3 are provided with a communication equipment 4 which is capable of transmitting and receiving data as shown in FIG. 8, and connected with each other through a public communication network or a specific communication network. In this FIG. 8, reference numeral 5 denotes a processor, 6 denotes a communication controller, 7 denotes a modulator-demodulator, 8 denotes a memory device, 9 denotes a display device, and 10 denotes an input device.

The purchase of a commodity is conducted by making use of a communication system, i.e. by receiving data concerning the commodities which are dealt with by a store 14 on the screen of display device 9 and then selecting a specific commodity from a plurality of commodities of the same kind. This is accomplished by operating the input device 10 so as to input an instruction of selection and purchase via the letters or 3-M ages displayed on the screen.

When the purchase of a commodity is instructed as indicated above, a predetermined quantity of service ticket according to the amount of money involved in the purchase of the commodity is delivered to the purchaser. In this case, the score point 12 of the service ticket to be given to the purchaser is indicated to the purchaser also by making use of the communication system. For example, it can be indicated at a portion of a confirmation display 11 indicating an establishment of transaction as shown in FIG. 3. The information of the score point 12 of service ticket to the purchaser may also be performed by using a separate display pattern.

Alternatively, the display pattern informing the score point 12 of the service ticket to the purchaser may include a total score point of service ticket up to date (including or not including the score point 12 of the purchase of this time) in addition to the notification of the score point 12 of service ticket obtained this time. Further, the display pattern may be a graph 13 (FIG. 4) or a digital display.

The exchange of the service ticket with a specific commodity or the allocation of the service ticket to the payment for a commodity can also be performed operating the input device by making use of the aforementioned communication system while watching the display device 9.

The management of the service tickets is performed by the store 14. Namely, the score point of the service ticket delivered to each purchaser 3 from the store 14 as well as the score point of the service ticket used by the purchaser 3 are processed by the processor 5 and the results are memorized in the memory device 8.

Figure 9:
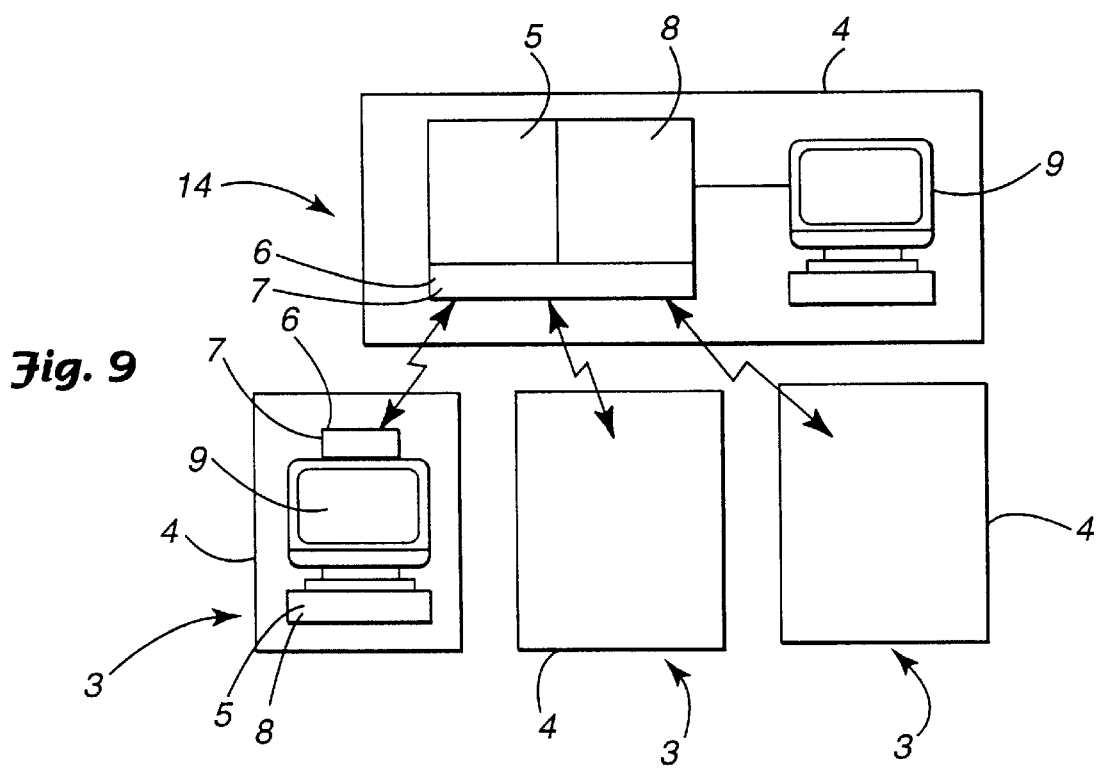
FIG. 9 is a block diagram illustrating a manner of confirming data on the counting of service ticket collected.

These processed data are available to the store 14 and each purchaser 3 via a communication system so that these processed data can be confirmed by the individual display device 9 (FIG. 9).

Figure 10:
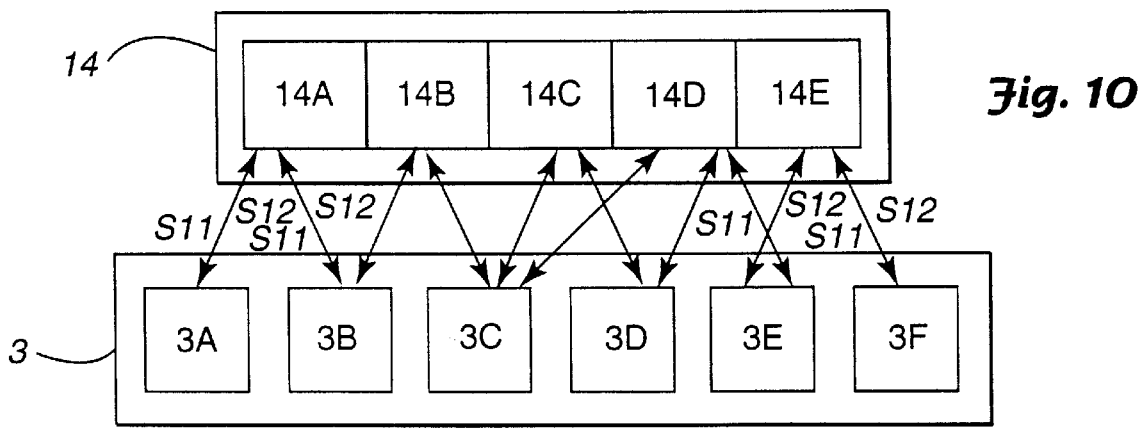
FIG. 10 is a block diagram showing a flow of service ticket according further example of this invention.

FIG. 10 shows a block diagram illustrating a flow (transfer of service ticket in a system of issuing a service ticket according to this invention wherein a plurality of member stores 14A, 14B, 14C and etc. (as seen in a group consisted of a head office and a plurality of branch stores, or a group of chain stores), and a plurality of purchasers 3 trading with these member stores 14 are involved.

In this case, the processing, counting of score points and memory of the service ticket are performed for each member store 14A, 14B, 14C and etc. and for each purchaser 3A, 3B, 3C and etc. dealing with these member stores.

As explained above, according to this invention, the conventional tangible service ticket is no longer required to be possessed, transferred or adhered onto a sheet by a purchaser. Namely, the service ticket is merely displayed as electronic data in a display device of a communication apparatus by making use of a communication system. Accordingly, the method of issuing a service ticket as proposed by this invention is most suited for use in a transaction making use of a communication system.

Moreover, since the management of a tangible service ticket is no longer required in the method of this invention, the non-use of a service ticket due to the loss and neglect of the service ticket can be avoided, thus making it possible to reliably and effectively carry out the management and utilization of the service ticket.

I claim:

1. A method of issuing a service ticket in a commodity transaction by making use of a communication system for shopping wherein the commodity transaction is performed by a purchaser, said method comprising:

selecting the commodity from a plurality of commodities displayed together with letter and image data on the commodities in a display device of a communication system terminal possessed by the purchaser, said letter and image data being transmitted by a member store through said communication system connecting communication equipment owned by the member stores and a service ticket distributor and said communication system terminal owned by the purchaser via said communication system to each other;

providing the service ticket distributor with a processing, memorizing and managing means for dealing with data on a list of purchasers, a list of member stores and the counting of distribution and acquisition of service tickets;

using said communication system to deliver (a) the service ticket from the member store to the purchaser according to an amount of transaction, (b) information of said transaction between the purchaser and the member store, and (c) execution of the service ticket by the purchaser at the member store said communication equipment and communication system terminal owned individually by the purchasers, the member stores and the service ticket distributor; and displaying the data possessed by the service ticket distributor on any changes in amount of service ticket in the purchasers and in the member stores through the displays of said communication equipment and communication system terminal owned by the purchasers and the member stores so as to be confirmed by the purchasers and the member stores.

2. The method of issuing a service ticket in transactions of commodity according to claim 1, wherein said delivery of a service ticket to a purchaser is performed by the service ticket distributor by making use of said communication system and informing said service ticket distributor as to the amount of transaction between the member store and the purchaser by the member store.

3. A method of issuing a service ticket in a commodity transaction by making use of a communication system for shopping wherein the commodity transaction is performed by a purchaser, said method comprising:

selecting a commodity from a plurality of commodities displayed together with letter and image data on the commodities in a display device of a communication system terminal possessed by the purchaser, said letter and image data being supplied and transmitted by a member store through a communication system connecting communication equipment owned by the member store and said communication system terminal owned by the purchaser via said communication system to each other;

providing the member store with a data on list of purchasers and with processing, memorizing and managing means for dealing with the counting of distribution and acquisition of service tickets;

using said communication system to deliver (a) the service ticket from the member store to the purchaser according to an amount of transaction, (b) information of said transaction between the purchaser and the member store, and (c) execution of the service ticket by the purchaser at the member store via said communication equipment and communication system terminal owned individually by the purchasers and the member store; and displaying the data possessed by the member store on any changes in amount of service ticket in the purchasers and in the member store through the displays of said communication equipment and said communication system terminal owned by the purchasers and the member store so as to be confirmed by the purchasers and the member store.

4. The method of issuing a service ticket in transactions of commodity according to claim 3, wherein said store is a member store of an organization comprising a plurality of member stores.

* * * * *